United States Patent
Wang

(10) Patent No.: US 12,133,108 B2
(45) Date of Patent: Oct. 29, 2024

(54) METHOD AND DEVICE FOR DETERMINING TERMINAL BEHAVIOR ANALYSIS

(71) Applicant: DATANG MOBILE COMMUNICATIONS EQUIPMENT CO., LTD., Beijing (CN)

(72) Inventor: Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 462 days.

(21) Appl. No.: 17/600,604

(22) PCT Filed: Mar. 2, 2020

(86) PCT No.: PCT/CN2020/077501
§ 371 (c)(1),
(2) Date: Oct. 1, 2021

(87) PCT Pub. No.: WO2020/199824
PCT Pub. Date: Oct. 8, 2020

(65) Prior Publication Data
US 2022/0201534 A1    Jun. 23, 2022

(30) Foreign Application Priority Data
Apr. 2, 2019  (CN) .......................... 201910262791.8

(51) Int. Cl.
*H04W 28/02*  (2009.01)
*H04L 67/1396*  (2022.01)
*H04L 67/50*  (2022.01)

(52) U.S. Cl.
CPC ..... *H04W 28/0231* (2013.01); *H04L 67/1396* (2022.05); *H04L 67/535* (2022.05)

(58) Field of Classification Search
CPC . H04W 28/00; H04W 28/02; H04W 28/0231; H04W 28/0827; H04L 41/0803;
(Continued)

(56) References Cited

U.S. PATENT DOCUMENTS 11,405,803 B2 *  8/2022  Fiorese .................. H04W 24/02
2018/0262924 A1  9/2018  Dao et al.
(Continued)

FOREIGN PATENT DOCUMENTS

CN    109361526 A    2/2019
CN    109417534 A    3/2019
(Continued)

OTHER PUBLICATIONS

China Mobile et al.,"TS 23.288 Performance Improvement and Supervision of general mode for mioT Terminals", 3GPP TSG-SA WG2 Meeting #130, Jan. 21-25, 2019, Kochi, India, total 8 pages, S2-1900504.
(Continued)

*Primary Examiner* — Warner Wong
(74) *Attorney, Agent, or Firm* — Kilpatrick Townsend & Stockton LLP

(57) ABSTRACT

Disclosed are a method and device for determining analytics on UE behavior. The method of the present application includes: receiving, by a network function entity, target information of a UE; requesting an NWDAF to provide abnormal behavior analytics for the UE when the network function entity determines to perform the abnormal behavior analytics for the UE according to the target information; and/or triggering a PCF to perform policy control for an abnormal behavior of the UE when the network function entity determines to perform the policy control for the abnormal behavior of the UE according to the target information.

14 Claims, 8 Drawing Sheets

(58) Field of Classification Search
CPC ......... H04L 41/0681; H04L 2012/5631; H04L 2012/5636; H04L 43/00; H04L 43/02; H04L 43/04; H04L 43/08; H04L 43/10; H04L 51/21; H04L 63/1408; H04L 67/535; H04L 67/1396
See application file for complete search history.

(56) References Cited

U.S. PATENT DOCUMENTS

| | | | |
|---|---|---|---|
| 2018/0352050 A1 | 12/2018 | Li et al. | |
| 2019/0222489 A1* | 7/2019 | Shan | H04M 15/8022 |
| 2020/0045559 A1* | 2/2020 | Kim | H04W 28/0268 |
| 2020/0196169 A1* | 6/2020 | Dao | H04W 72/535 |
| 2021/0076320 A1* | 3/2021 | Park | H04L 69/322 |
| 2021/0092588 A1* | 3/2021 | Xin | H04L 41/14 |
| 2021/0266765 A1* | 8/2021 | Zhang | H04W 24/02 |
| 2021/0306877 A1* | 9/2021 | Blake | H04L 41/0677 |
| 2021/0314795 A1* | 10/2021 | Li | H04W 28/0231 |
| 2021/0314906 A1* | 10/2021 | Matolia | H04W 84/02 |
| 2021/0344410 A1* | 11/2021 | Ge | H04B 7/18506 |
| 2021/0351993 A1* | 11/2021 | Puente Pestaña | H04L 41/046 |
| 2021/0377837 A1* | 12/2021 | Xu | H04W 36/165 |
| 2022/0070702 A1* | 3/2022 | Puente Pestana | H04L 43/065 |

FOREIGN PATENT DOCUMENTS

| | | |
|---|---|---|
| CN | 109548178 A | 3/2019 |
| WO | 2018161850 A1 | 9/2018 |
| WO | WO-2022033659 A1 * | 2/2022 ............ G06F 21/577 |

OTHER PUBLICATIONS

Ericsson, "Update to Expected UE behaviour related network data analytics", 3GPP TSG-SA WG2 Meeting #131, Feb. 25-Mar. 1 Santa Cruz, Tenerife, Spain, total 5 pages, S2-1901569.
3GPP TS 23.288 V0.3.0, 3rd Generation Partnership Project; Technical Specification Group Services and System Aspects; Architecture enhancements for 5G System (5GS) to support network data analytics services(Release 16), total 44 pages, Mar. 2019.
3GPP TS 23.502 V16.0.2, 3rd Generation Partnership Project; Technical Specification Group Services and System Aspects; Procedures for the 5G System; Stage 2 (Release 16), total 419 pages, Apr. 2019.
China Mobile, "Procedure proposal for abnormal behaviour related network data analytics", 3GPP TSG-SA WG2 Meeting #131, Feb. 25-Mar. 1, 2019, Tenerife, Spain, total 4 pages, S2-1901894.
Catt et al., "Update to Abnormal behaviour related network data analytics", 3GPP TSG-SA WG2 Meeting #131 Feb. 25-Mar. 1, 2019, Santa Cruz, Tenerife, Spain, total 4 pages, S2-1902560.
Catt, "Update and Evaluation of solution 21", SA WG2 Meeting #129bis, Nov. 26-30, 2018, West Palm Beach, USA, total 6 pages, S2-1813203.
Nec, "eNA KI-8-Solution 21—Addition of a new UE abnormal behaviour mnitoring event", SA WG2 Meeting #129bis, Nov. 26-30, 2018, West Palm Beach, USA, total 5 pages, S2-1813214(was S2-1812805_S2-1812011).
China Mobile et al., "TS 23.288 Performance Improvement and Supervision of general mode for mIoT Terminals", 3GPP TSG-SA WG2 Meeting #130, Jan. 21-25, 2019, Kochi, India, total 7 pages, S2-1901084(was S2-1900957/0504).

* cited by examiner

METHOD AND DEVICE FOR DETERMINING TERMINAL BEHAVIOR ANALYSIS

CROSS-REFERENCE OF RELATED APPLICATIONS

This application is a US National Stage of International Application No. PCT/CN2020/077501, filed Mar. 2, 2020, which claims priority to Chinese Patent Application No. 201910262791.8, filed with the Chinese Patent Office on Apr. 2, 2019 and entitled "Method and Device for Determining Terminal Behavior Analysis", which is hereby incorporated by reference in its entirety.

FIELD

The present application relates to the field of wireless communication technology, and particularly to a method and device for determining analytics on UE behavior.

BACKGROUND

The 3GPP defines an NWDAF (Network Data Analytic Function) to analyze the UE (User Equipment) behavior. The NWDAF may determine whether the UE deviates from the expected behavior model of the UE by analyzing the UE's behavior. When the UE's behavior deviates from the expected terminal behavior, for example, abnormal traffic model, incorrect access address, etc., the NWDAF further decides whether to alert the 5G core network or application layer to and trigger the 5G core network or the application layer to take risk prevention measures.

Currently, the 3GPP has proposed the following procedure to support the NWDAF to detect the abnormal behavior of the UE.

As shown in FIG. 1, a schematic diagram of the process in which the NWDAF performs the abnormality detection on the UE is illustrated.

100a or 100b: the network function in the network or the application function of the application layer may send a subscription request to the NWDAF to subscribe to notifications or alarms about abnormal behaviors of the UE.

The network function here may be Consumer NF (Network Function), and the application function may be NEF (Network Exposure Function) and Application Function (AF).

As shown in FIG. 1, when the network function is the Consumer NF, the Consumer NF sends a subscription request to the NWDAF to subscribe to notifications or alarms about abnormal behaviors of the UE; when the application function is the NEF and AF, the AF firstly sends a subscription request to the NEF, and the NEF sends a subscription request to the NWDAF to subscribe to notifications or alarms about abnormal behaviors of the UE.

101: the NWDAF obtains the mobility information or session information of the UE from an AMF (Access and mobility Management Function) or SMF (Session Management Function).

In order to analyze the UE behavior, the NWDAF may need to collect the application behavior information from the 5G core network, for example, collect the mobility information or session information of the UE from the AMF or SMF.

102: the AMF or SMF checks the UE's behavior.

If supported by the network, the AMF or SMF may perform the first round of inspection on the UE to judge whether the UE's behavior deviates from the expected behavior model of the UE in advance before reporting the abnormal behavior of the UE to the NWDAF.

103: the AMF or SMF sends the behavior information of the UE to the NWDAF.

104: the NWDAF determines that the UE's behavior is abnormal by analyzing the received behavior information of the UE.

Similarly, the network function here may be the Consumer NF, and the application function may be the NEF and AF.

105a or 105b: the NWDAF sends a notification that the UE's behavior is abnormal to the network function or the application function that subscribe to such notification.

As shown in FIG. 1, the NWDAF sends a notification that the UE's behavior is abnormal to the Consumer NF in 105a; the NWDAF sends a notification that the UE's behavior is abnormal to the NEF and the NEF sends the notification that the UE's behavior is abnormal to the AF in S105b.

106a or 106b: the network function initiates the corresponding policy or behavior according to the type of the abnormal behavior of the UE, or the application layer autonomously executes the corresponding action according to the logic of the application layer.

As shown in FIG. 1, in S106a, if the Consumer NF receives the notification from the NWDAF, the Consumer NF initiates the corresponding policy or behavior according to the type of the abnormal behavior of the UE; in S106b, if the NEF receives the notification from the NWDAF, the NEF sends the notification to the AF and the AF executes the corresponding action.

To sum up, it is impossible to determine when and how the 5G core network or application layer triggers the abnormal behavior analytics and/or the policy control for the abnormal behavior for the UE in the related art.

SUMMARY

The present application provides a method and device for determining analytics on UE behavior, to solve the problem in the related art that it is impossible to determine when and how the 5G core network or application layer triggers the abnormal behavior analytics and/or the policy control for the abnormal behavior for the UE.

In a first aspect, an embodiment of the present application provides a method for determining analytics on UE behavior, the method including: receiving, by a network function entity, target information of a UE; requesting an NWDAF to provide abnormal behavior analytics for the UE when the network function entity determines to perform the abnormal behavior analytics for the UE according to the target information; and/or triggering a PCF to perform policy control for an abnormal behavior of the UE when the network function entity determines to perform the policy control for the abnormal behavior of the UE according to the target information.

In the above method, after determining to perform the abnormal behavior analytics for the UE, the network function entity requests the NWDAF to provide the abnormal behavior analytics for the UE, and/or the network function entity determines to perform the policy control for the abnormal behavior of the UE and triggers the PCF to perform the policy control for the abnormal behavior of the UE. Thus, the moment at which the abnormal behavior analytics and/or the policy control for the abnormal behavior is/are performed for the UE may be determined, and then the system performance may be improved.

In a possible implementation, determining, by the network function entity, to perform the abnormal behavior analytics for the UE and/or perform the policy control for the abnormal behavior of the UE according to the received target information of the UE, includes: determining, by the network function entity, to perform the abnormal behavior analytics for the UE and/or perform the policy control for the abnormal behavior of the UE according to received subscription of the UE when the target information is the subscription; or determining, by the network function entity, to perform the abnormal behavior analytics for the UE and/or perform the policy control for the abnormal behavior of the UE according to received monitoring event type of the UE when the target information is a monitoring event; or determining, by the network function entity, to perform the abnormal behavior analytics for the UE and/or perform the policy control for the abnormal behavior of the UE according to received UE capability when the target information is the UE capability.

In the above method, the target information may include subscription, a monitoring event, and UE capability. When the target information is subscription, a monitoring event and UE capability respectively, the network function entity needs to perform the abnormal behavior analytics and/or the policy control for the abnormal behavior of the UE, so that the network function entity may request the NWDAF to provide the abnormal behavior analytics of the UE and/or trigger the PCF to perform the policy control for the abnormal behavior of the UE.

In a possible implementation, requesting the NWDAF to provide abnormal behavior analytics of the UE, includes: requesting, by an AMF entity, the NWDAF to provide mobility related abnormal behavior analytics for the UE when the network function entity is the AMF entity; or requesting, by an SMF entity, the NWDAF to provide PDU session related abnormal behavior analytics for the UE when the network function entity is the SMF entity.

In the above method, the network function entity may be an AMF entity or an SMF entity. When the network function entity is an AMF entity, the AMF entity requests the NWDAF to provide the mobility related abnormal behavior analytics for the UE; when the network function entity is an SMF entity, the SMF entity requests the NWDAF to provide the PDU session related abnormal behavior analytics for the UE.

In a possible implementation, triggering, by the network function entity, the PCF to perform policy control for the abnormal behavior of the UE, includes: triggering the PCF to perform the policy control for the abnormal behavior, which then triggers the PCF to request the NWDAF to provide abnormal behavior analytics for the UE when the network function entity establishes or modifies mobility management or session management policy association towards the PCF entity.

The above method shows how the network function entity triggers the PCF to perform policy control for the abnormal behavior of the UE. Firstly, when the network function entity establishes or modifies the mobility management or session management policy association towards the PCF entity, the network function entity triggers the PCF entity to perform the policy control for the abnormal behavior, which then triggers the PCF entity to request the NWDAF to provide the abnormal behavior analytics for the UE, and determining the moment at which the NWDAF provides the PCF entity with the abnormal behavior analytics of the UE, and improving the system performance.

In a possible implementation, triggering the PCF to perform the policy control for the abnormal behavior, which then triggers the PCF to request the NWDAF to provide the abnormal behavior analytics for the UE when the network function entity establishes or modifies mobility management or session management policy association towards the PCF entity, includes: triggering, by an AMF entity, the PCF entity to request the NWDAF to provide mobility related abnormal behavior analytics for the UE when the network function entity is the AMF entity; or triggering, by an SMF entity, the PCF entity to request the NWDAF to provide PDU session related abnormal behavior analytics for the UE when the network function entity is the SMF entity.

The above method shows what kind of abnormal behavior analytics that the network function entity triggers the PCF entity to request the NWDAF to provide when the network function entity is an AMF entity or an SMF entity. When the network function entity is an AMF entity, the AMF entity triggers the PCF entity to request the NWDAF to provide the mobility related abnormal behavior analytics for the UE; when the network function entity is an SMF entity, the SMF entity triggers the PCF entity to request the NWDAF to provide the PDU session related abnormal behavior analytics for the UE.

In a second aspect, an embodiment of the present application provides a method for determining analytics on UE behavior, the method including: receiving, by an NWDAF, an indication sent by a network function entity and/or sent by a PCF entity triggered by the network function entity; and providing, by the NWDAF, abnormal behavior analytics for a UE to the network function entity and/or the PCF entity according to the indication.

In the above method, firstly the NWDAF receives the indication sent by the network function entity and/or sent by the PCF entity triggered by the network function entity, and then the NWDAF provides the abnormal behavior analytics for the UE to the network function entity and/or the PCF entity according to the indication, so that the moment at which the abnormal behavior analytics and/or the policy control for the abnormal behavior is/are performed for the UE may be determined, and thus the system performance may be improved.

In a possible implementation, providing, by the NWDAF, abnormal behavior analytics for the UE to the network function entity and/or the PCF entity according to the indication, includes: providing, by the NWDAF, mobility related abnormal behavior analytics for the UE to an AMF entity and/or the PCF entity when the network function entity is the AMF entity; or providing, by the NWDAF, PDU session related abnormal behavior analytics for the UE to an SMF entity and/or the PCF entity when the network function entity is the SMF entity.

The above method gives the ways in which the NWDAF provides the network function entity and/or PCF entity with different abnormal behavior analytics for different network function entities. When the network functional entity is an AMF entity, the NWDAF provides the mobility related abnormal behavior analytics for the UE to the AMF entity; when the network function entity is an SMF entity, the NWDAF provides the PDU session related abnormal behavior analytics for the UE to the SMF entity.

In a third aspect, an embodiment of the present application provides a method for determining analytics on UE behavior, the method including: receiving, by a PCF entity, a notification to perform policy control of an abnormal behavior of a UE triggered from a network function entity of triggering policy control for an abnormal behavior of a UE when the PCF entity establishing or modifying mobility management or session management policy association towards the network function entity; and requesting, by the PCF entity, an NWDAF to provide abnormal behavior analytics of the UE.

In the above method, firstly the PCF entity receives the notification from the network function entity of triggering policy control for the abnormal behavior of the UE when the PCF entity establishing or modifying the mobility management or session management policy association towards the network function entity, and then the PCF entity requests the NWDAF to provide the abnormal behavior analytics of the UE, so that the moment at which the abnormal behavior analytics and/or the policy control for the abnormal behavior is/are performed for the UE may be determined, and thus the system performance may be improved.

In a possible implementation, requesting, by the PCF entity, the NWDAF to provide abnormal behavior analytics of the UE, includes: requesting, by the PCF entity, the NWDAF to provide mobility related abnormal behavior analytics of the UE when the network function entity is an AMF entity; or requesting, by the PCF entity, the NWDAF to provide PDU session related abnormal behavior analytics of the UE when the network function entity is an SMF entity.

In the above method, the network function entity may be an AMF entity or an SMF entity. When the network function entity is an AMF entity, the PCF entity requests the NWDAF to provide the mobility related abnormal behavior analytics of the UE; when the network function entity is an SMF entity, the PCF entity requests the NWDAF to provide the PDU session related abnormal behavior analytics of the UE.

In a fourth aspect, an embodiment of the present application provides a network function entity for determining analytics on UE behavior. The network functional entity includes: a processor, a memory and a transceiver; where the processor is configured to read a program in the memory and perform: receiving target information of a UE; requesting an NWDAF to provide abnormal behavior analytics for the UE in response to determining to perform the abnormal behavior analytics for the UE according to the target information; and/or triggering a PCF to perform policy control for an abnormal behavior of the UE in response to determining to perform the policy control for the abnormal behavior of the UE according to the target information.

In a possible implementation, the processor is configured to: determine to perform the abnormal behavior analytics for the UE and/or perform the policy control for the abnormal behavior of the UE according to received subscription of the UE when the target information is the subscription; or determine to perform the abnormal behavior analytics for the UE and/or perform the policy control for the abnormal behavior of the UE according to received monitoring event type of the UE when the target information is a monitoring event; or determine to perform the abnormal behavior analytics for the UE and/or perform the policy control for the abnormal behavior of the UE according to received UE capability when the target information is the UE capability.

In a possible implementation, the processor is configured to: request the NWDAF to provide mobility related abnormal behavior analytics for the UE when the network function entity is an AMF entity; or request the NWDAF to provide PDU session related abnormal behavior analytics for the UE when the network function entity is an SMF entity.

In a possible implementation, the processor is configured to: trigger the PCF to perform the policy control for the abnormal behavior, which then triggers the PCF to request the NWDAF to provide abnormal behavior analytics for the UE when establishing or modifying mobility management or session management policy association towards the PCF entity.

In a possible implementation, the processor is configured to: trigger the PCF entity to request the NWDAF to provide mobility related abnormal behavior analytics for the UE when the network function entity is an AMF entity; or trigger the PCF entity to request the NWDAF to provide PDU session related abnormal behavior analytics for the UE when the network function entity is an SMF entity.

In a fifth aspect, an embodiment of the present application provides an NWDAF for determining analytics on UE behavior. The NWDAF includes: a processor, a memory and a transceiver; where the processor is configured to read a program in the memory and perform: receiving an indication sent by a network function entity and/or sent by a PCF entity triggered by the network function entity; and providing abnormal behavior analytics for a UE to the network function entity and/or the PCF entity according to the indication.

In a possible implementation, the processor is configured to: provide mobility related abnormal behavior analytics for the UE to an AMF entity and/or the PCF entity when the network function entity is the AMF entity; or provide PDU session related abnormal behavior analytics for the UE to an SMF entity and/or the PCF entity when the network function entity is the SMF entity.

In a sixth aspect, an embodiment of the present application provides a PCF entity for determining analytics on UE behavior. The PCF entity includes: a processor, a memory and a transceiver; where the processor is configured to read a program in the memory and perform: receiving a notification from a network function entity of triggering policy control for an abnormal behavior of a UE when establishing or modifying mobility management or session management policy association towards the network function entity; and requesting an NWDAF to provide abnormal behavior analytics of the UE.

In a possible implementation, the processor is configured to: request the NWDAF to provide mobility related abnormal behavior analytics of the UE when the network function entity is an AMF entity; or request the NWDAF to provide PDU session related abnormal behavior analytics of the UE when the network function entity is an SMF entity.

In a seventh aspect, an embodiment of the present application provides a network function entity for determining analytics on UE behavior. The network function entity includes: a first receiving device configured to: receive target information of a UE; and a processing device configured to: request an NWDAF to provide abnormal behavior analytics for the UE in response to determining to perform the abnormal behavior analytics for the UE according to the target information; and/or trigger a PCF to perform policy control for an abnormal behavior of the UE in response to determining to perform the policy control for the abnormal behavior of the UE according to the target information.

In a possible implementation, the processing device is configured to: determine to perform the abnormal behavior analytics for the UE and/or perform the policy control for the abnormal behavior of the UE according to received subscription of the UE when the target information is the subscription; or determine to perform the abnormal behavior analytics for the UE and/or perform the policy control for the abnormal behavior of the UE according to received monitoring event type of the UE when the target information is a monitoring event; or determine to perform the abnormal behavior analytics for the UE and/or perform the policy control for the abnormal behavior of the UE according to received UE capability when the target information is the UE capability.

In a possible implementation, the processing device is configured to: request the NWDAF to provide mobility related abnormal behavior analytics for the UE according to the target information when the network function entity is an AMF entity; or request the NWDAF to provide PDU session related abnormal behavior analytics for the UE according to the target information when the network function entity is an SMF entity.

In a possible implementation, the processing device is configured to: trigger the PCF to perform the policy control for the abnormal behavior, which then triggers the PCF to request the NWDAF to provide abnormal behavior analytics for the UE when establishing or modifying mobility management or session management policy association towards the PCF entity.

In a possible implementation, the processing device is configured to: trigger the PCF entity to request the NWDAF to provide mobility related abnormal behavior analytics for the UE when the network function entity is an AMF entity; or trigger the PCF entity to request the NWDAF to provide PDU session related abnormal behavior analytics for the UE when the network function entity is an SMF entity.

In an eighth aspect, an embodiment of the present application provides an NWDAF for determining analytics on UE behavior. The NWDAF includes: a second receiving device configured to: receive an indication sent by a network function entity and/or sent by a PCF entity triggered by the network function entity; and a providing device configured to: provide abnormal behavior analytics for a UE to the network function entity and/or the PCF entity according to the indication.

In a possible implementation, the providing device is configured to: provide mobility related abnormal behavior analytics for the UE to an AMF entity and/or the PCF entity when the network function entity is the AMF entity; or provide PDU session related abnormal behavior analytics for the UE to an SMF entity and/or the PCF entity when the network function entity is the SMF entity.

In a ninth aspect, an embodiment of the present application provides a PCF entity for determining analytics on UE behavior. The PCF entity includes: a third receiving device configured to: receive a notification from a network function entity of triggering policy control for an abnormal behavior of a UE when establishing or modifying mobility management or session management policy association towards the network function entity; and a request device configured to: request an NWDAF to provide abnormal behavior analytics of the UE.

In a possible implementation, the request device is configured to: request the NWDAF to provide mobility related abnormal behavior analytics of the UE when the network function entity is an AMF entity; or request the NWDAF to provide PDU session related abnormal behavior analytics of the UE when the network function entity is an SMF entity.

In a tenth aspect, an embodiment of the present application further provides a computer storage medium on which a computer program is stored, where the program, when executed by a processor, implements the steps of any one of the methods in the first aspect or the steps of any one of the methods in the second aspect or the steps of any one of the methods in the third aspect described above.

DETAILED DESCRIPTION (1) In embodiments of the present application, the nouns "network" and "system" are often used alternately.

(2) The term "a plurality of" in embodiments of the present application refers to two or more, and other quantifiers are similar thereto.

(3) "and/or" describes the association relationship of the associated objects, and indicates that there may be three relationships, for example, A and/or B may represent:

only A, both A and B, and only B. The character "/" generally indicates that the associated objects have a kind of "or" relationship.

There are various types of UEs in 5G networks, such as Internet of Things (IoT) terminal. Since the UE is deployed in an unattended location, it is extremely vulnerable to malicious behaviors such as damage, theft, and hacker attack. Therefore, it is necessary to analyze the behavior of the UE. If the UE suffers from malicious behaviors such as damage, theft or hacker attack, it is necessary to take risk prevention measures against the UE in time.

The operation of taking prevention measures against the UE is performed by the 5G core network or application layer. If the 5G core network or application layer is triggered to take risk prevention measures against the UE all the time, the resources may be wasted and the system performance may be reduced.

In order to improve the system performance, the 5G core network or application layer may request the NWDAF to provide the 5G core network or application layer with abnormal behavior analytics for the UE under certain conditions.

The application scenarios described in embodiments of the present application are intended to illustrate the embodiments of the present application more clearly, and do not constitute a limitation on the embodiments of the present application.

Figure 1:
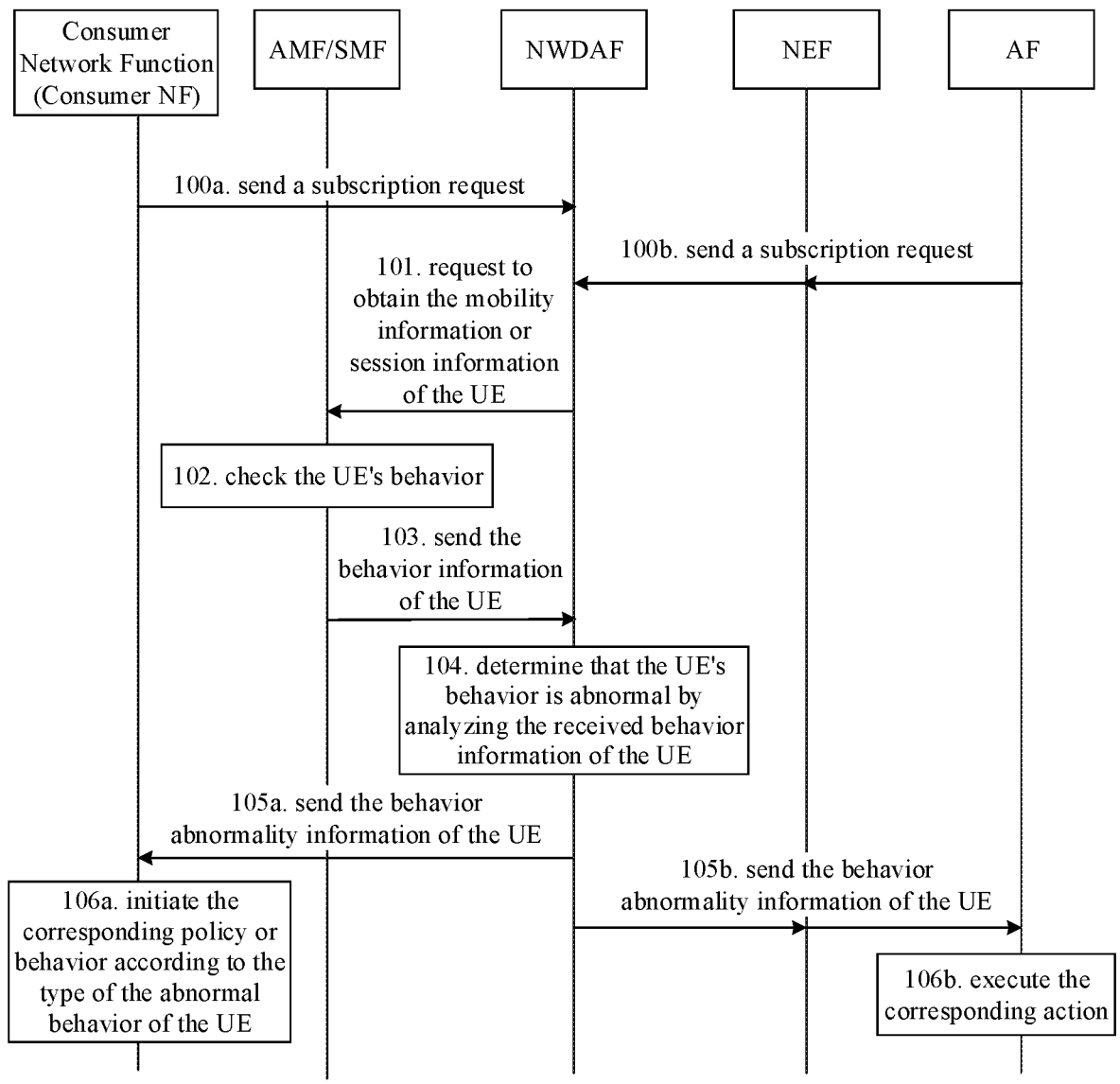
FIG. 1 is a schematic diagram of a process in which the NWDAF performs the abnormality detection on a UE in the background part.
Figure 2:
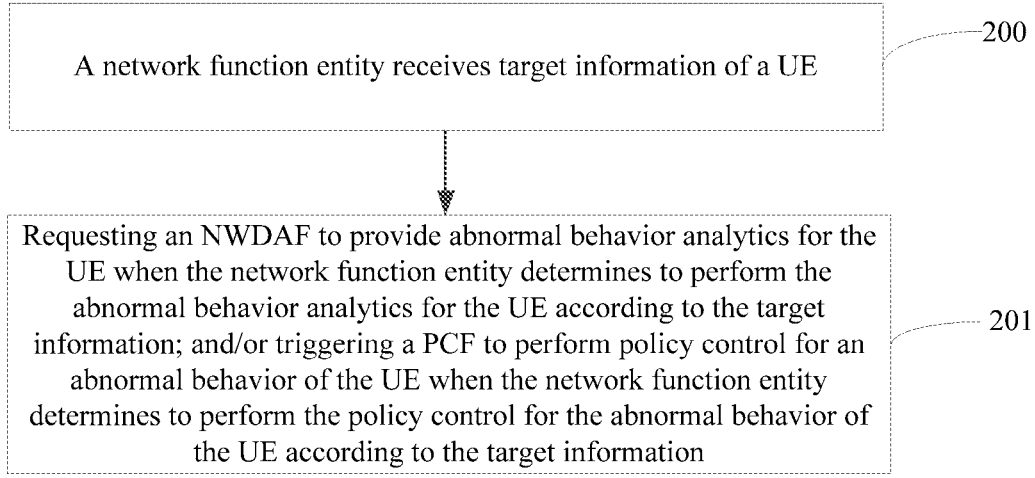
FIG. 2 is a schematic flowchart of a first method for determining analytics on UE behavior provided by an embodiment of the present application.

In view of the foregoing scenarios, the present application provides a method for determining analytics on UE behavior. As shown in FIG. 2, the method includes the following steps.

200: a network function entity receives target information of a UE.

201: requesting an NWDAF to provide abnormal behavior analytics for the UE when the network function entity determines to perform the abnormal behavior analytics for the UE according to the target information; and/or triggering a PCF (Policy Control Function) to perform policy control for an abnormal behavior of the UE when the network function entity determines to perform the policy control for the abnormal behavior of the UE according to the target information.

In embodiments of the present application, the network function entity firstly receives the target information of the UE; when the network function entity determines to perform the abnormal behavior analytics for the UE according to the received target information of the UE, then the network function entity requests the NWDAF to provide the abnormal behavior analytics for the UE; when the network function entity determines to perform the policy control for the abnormal behavior of the UE according to the target information of the UE, then the network function entity triggers the PCF to perform the policy control for the abnormal behavior of the UE. Thus, the moment at which the abnormal behavior analytics and/or the policy control for the abnormal behavior is/are performed for the UE may be determined, and then the system performance may be improved.

In an implementation, the network function entity may determine to perform the abnormal behavior analytics for the UE according to the target information, and the network function entity may also determine that to perform the policy control for the abnormal behavior of the UE according to the target information.

The target information of the UE may be subscription, or a monitoring event, or UE capability.

The network function entity may be an AMF entity or an SMF entity.

These cases will be illustrated below respectively.

Case 1: the target information of the UE is subscription, the network function entity is an AMF entity, and the network function entity determines to perform the abnormal behavior analytics for the UE according to the target information.

In an embodiment of the present application, the abnormal behavior analytics may be mobility related abnormal behavior analytics, or PDU (Packet Data Unit) session related abnormal behavior analytics. Since the network function entity is an AMF entity, the abnormal behavior analytics is the mobility related abnormal behavior analytics. After determining that the AMF entity cannot meet the monitoring or analysis requirement in the subscription according to the subscription, the AMF entity determines to perform the mobility related abnormal behavior analytics for the UE. The AMF entity requests the NWDAF to provide the AMF entity with the mobility related abnormal behavior analytics for the UE. Thus, the AMF entity may determine the moment at which the NWDAF provides the AMF entity with the mobility related abnormal behavior analytics for the UE, and improving the system performance.

Case 2: the target information of the UE is subscription, the network function entity is an SMF entity, and the network function entity determines to perform the abnormal behavior analytics for the UE according to the target information.

Since the network function entity is an SMF entity, the abnormal behavior analytics is the PDU session related abnormal behavior analytics. After determining that the SMF entity cannot meet the monitoring or analysis requirement in the subscription according to the subscription, the SMF entity determines to perform the PDU session related abnormal behavior analytics for the UE. The SMF entity requests the NWDAF to provide the SMF entity with the PDU session related abnormal behavior analytics for the UE. Thus, the SMF entity may determine the moment at which the NWDAF provides the SMF entity with the PDU session related abnormal behavior analytics for the UE, and improving the system performance.

Case 3: the target information of the UE is a monitoring event, the network function entity is an AMF entity, and the network function entity determines to perform the abnormal behavior analytics for the UE according to the target information.

According to the received monitoring event of the UE, the AMF entity determines to perform the mobility related abnormal behavior analytics for the UE. The AMF entity requests the NWDAF to provide the AMF entity with the mobility related abnormal behavior analytics for the UE. Thus, the AMF entity may determine the moment at which the NWDAF provides the AMF entity with the mobility related abnormal behavior analytics for the UE, and improving the system performance.

Case 4: the target information of the UE is a monitoring event, the network function entity is an SMF entity, and the network function entity determines to perform the abnormal behavior analytics for the UE according to the target information.

According to the received monitoring event of the UE, the SMF entity determines to perform the PDU session related abnormal behavior analytics for the UE. The SMF entity requests the NWDAF to provide the SMF entity with the PDU session related abnormal behavior analytics for the UE. Thus, the SMF entity may determine the moment at which the NWDAF provides the SMF entity with the PDU session related abnormal behavior analytics for the UE, and improving the system performance.

Case 5: the target information of the UE is UE capability, the network function entity is an AMF entity, and the network function entity determines to perform the abnormal behavior analytics for the UE according to the target information.

According to the received UE capability, the AMF entity determines to perform the mobility related abnormal behavior analytics for the UE. The AMF entity requests the NWDAF to provide the AMF entity with the mobility related abnormal behavior analytics for the UE. Thus, the AMF entity may determine the moment at which the NWDAF provides the AMF entity with the mobility related abnormal behavior analytics for the UE, and improving the system performance.

Case 6: the target information of the UE is UE capability, the network function entity is an SMF entity, and the network function entity determines to perform the abnormal behavior analytics for the UE according to the target information.

According to the received UE capability, the SMF entity determines to perform the PDU session related abnormal behavior analytics for the UE. The SMF entity requests the NWDAF to provide the SMF entity with the PDU session related abnormal behavior analytics for the UE. Thus, the SMF entity may determine the moment at which the NWDAF provides the SMF entity with the PDU session related abnormal behavior analytics for the UE, and improving the system performance.

Case 7: the target information of the UE is subscription, a monitoring event or UE capability, the network function entity is an AMF entity, and the network function entity determines to perform policy control for an abnormal behavior of the UE according to the target information.

When establishing or modifying the mobility management policy association towards the PCF entity, the AMF entity triggers the PCF to perform the policy control for the abnormal behavior, which may trigger the PCF to request the NWDAF to provide the mobility related abnormal behavior analytics for the UE.

It should be noted that the AMF entity may trigger the PCF to perform the policy control for the abnormal behavior when establishing or modifying the mobility management policy association towards the PCF entity, so the target information may be the subscription, the monitoring event or the UE capability.

Case 8: the target information of the UE is subscription, a monitoring event or UE capability, the network function entity is an SMF entity, and the network function entity determines to perform policy control for an abnormal behavior of the UE according to the target information.

When establishing or modifying the session management policy association towards the PCF entity, the SMF entity triggers the PCF to perform the policy control for the abnormal behavior, which may trigger the PCF to request the NWDAF to provide PDU session related abnormal behavior analytics.

Figure 3:
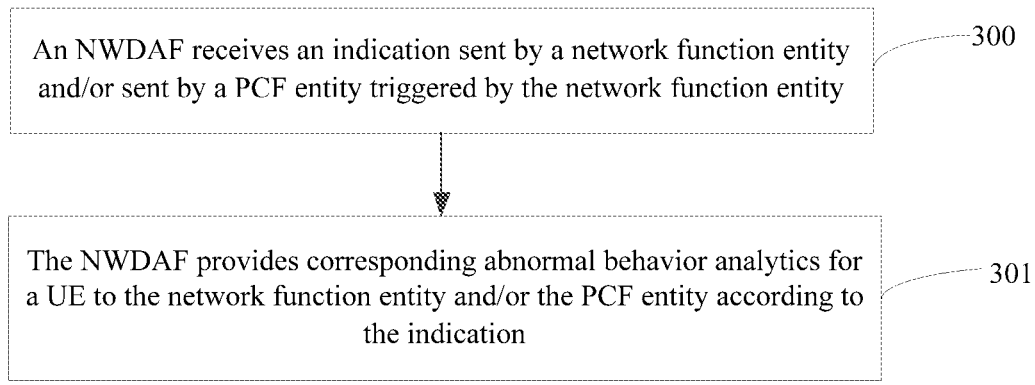
FIG. 3 is a schematic flowchart of a second method for determining analytics on UE behavior provided by an embodiment of the present application.

An embodiment of the present application further provides a method for determining analytics on UE behavior. As shown in FIG. 3, the method includes the following steps.

300: an NWDAF receives an indication sent by a network function entity and/or sent by a PCF entity triggered by the network function entity.

301: the NWDAF provides corresponding abnormal behavior analytics for a UE to the network function entity and/or the PCF entity according to the indication.

In embodiments of the present application, firstly the NWDAF receives the indication sent by the network function entity and/or sent by the PCF entity triggered by the network function entity, and then the NWDAF provides the abnormal behavior analytics for the UE to the network function entity and/or the PCF entity according to the indication, so that the moment at which the abnormal behavior analytics and/or the policy control for the abnormal behavior is/are performed for the UE may be determined, and thus the system performance may be improved.

Here, the network function entity may be an AMF entity or an SMF entity.

If the network function entity is the AMF entity, the NWDAF provides the mobility related abnormal behavior analytics for the UE to the AMF entity and/or the PCF entity; when the network function entity is the SMF entity, the NWDAF provides the PDU session related abnormal behavior analytics for the UE to the SMF entity and/or the PCF entity.

Figure 4:
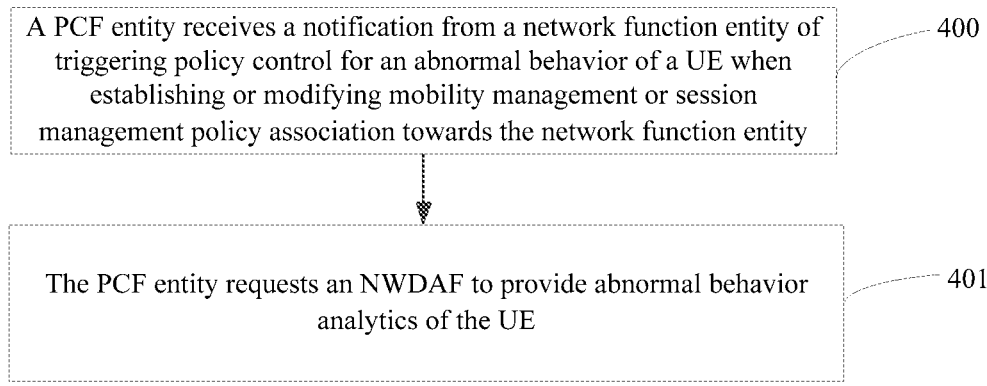
FIG. 4 is a schematic flowchart of a third method for determining analytics on UE behavior provided by an embodiment of the present application.

An embodiment of the present application further provides a method for determining analytics on UE behavior. As shown in FIG. 4, the method includes the following steps.

400: an NWDAF receives an indication sent by a network function entity and/or sent by a PCF entity triggered by the network function entity.

401: the NWDAF provides abnormal behavior analytics for a UE to the network function entity and/or the PCF entity according to the indication.

In embodiments of the present application, firstly the PCF entity receives the notification from the network function entity of triggering the policy control for the abnormal behavior of the UE when establishing or modifying the mobility management or session management policy association towards the network function entity, and then the PCF entity requests the NWDAF to provide the abnormal behavior analytics for the UE, so that the moment at which the abnormal behavior analytics and/or the policy control for the abnormal behavior is/are performed for the UE may be determined, and thus the system performance may be improved.

If the network function entity is an AMF entity, then the PCF entity requests the NWDAF to provide the mobility related abnormal behavior analytics for the UE; or if the network function entity is an SMF entity, then the PCF entity requests the NWDAF to provide the PDU session related abnormal behavior analytics for the UE.

Based on the same inventive concept, an embodiment of the present application further provides a network function entity for determining analytics on UE behavior. Since this device is the device for the communication method provided by embodiments of the present application and the principle of this device to solve the problem is similar to that of the method, the implementations of this device may refer to the implementations of the method, and the repeated description thereof will be omitted here.

Figure 5:
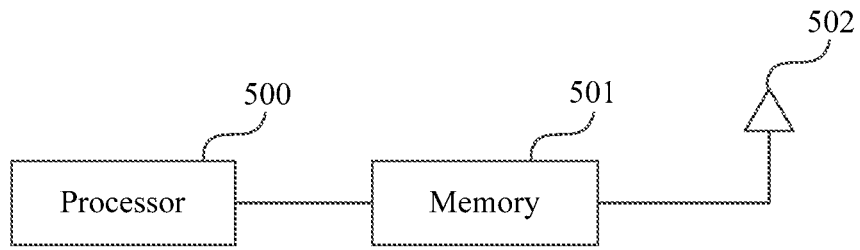
FIG. 5 is a structural schematic diagram of a first network function entity for determining analytics on UE behavior provided by an embodiment of the present application.

As shown in FIG. 5, an embodiment of the present application provides a network function entity for determining analytics on UE behavior. This device includes a processor 500, a memory 501 and a transceiver 502. The processor 500 is responsible for managing the bus architecture and general processing, and the memory 501 may store the data used by the processor 500 when performing the operations. The transceiver 502 is configured to receive and send the data under the control of the processor 500.

The bus architecture may include any numbers of interconnected buses and bridges, and link various circuits of one or more processors represented by the processor 500 and the memory represented by the memory 501. The bus architecture may further link various other circuits such as peripheral device, voltage regulator and power management circuit, which are all well known in the art and thus will not be further described again herein. The bus interface provides an interface. The processor 500 is responsible for managing the bus architecture and general processing, and the memory 501 may store the data used by the processor 500 when performing the operations.

The procedure disclosed by embodiments of the present application may be applied in the processor 500 or implemented by the processor 500. In the implementation process, each step of the signal processing flow may be completed by the integrated logic circuit of hardware in the processor 500 or the instruction in the form of software. The processor 500 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in embodiments of the present application. The general-purpose processor may be a microprocessor or any conventional processor or the like. The steps of the method disclosed in combination with embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 501, and the processor 500 reads the information in the memory 501 and completes the steps of the signal processing flow in combination with the hardware thereof.

The processor 500 is configured to read the program in the memory 501 and perform: receiving target information of a UE; requesting an NWDAF to provide abnormal behavior analytics for the UE in response to determining to perform the abnormal behavior analytics for the UE according to the target information; and/or triggering a PCF to perform policy control for an abnormal behavior of the UE in response to determining to perform the policy control for the abnormal behavior of the UE according to the target information.

In one embodiment, the processor 500 is configured to: determine to perform the abnormal behavior analytics for the UE and/or perform the policy control for the abnormal behavior of the UE according to received subscription of the UE when the target information is the subscription; or determine to perform the abnormal behavior analytics for the UE and/or perform the policy control for the abnormal behavior of the UE according to received monitoring event type of the UE when the target information is a monitoring event; or determine to perform the abnormal behavior analytics for the UE and/or perform the policy control for the abnormal behavior of the UE according to received UE capability when the target information is the UE capability.

In one embodiment, the processor 500 is configured to: request the NWDAF to provide mobility related abnormal behavior analytics for the UE when the network function entity is an AMF entity; or request the NWDAF to provide PDU session related abnormal behavior analytics for the UE when the network function entity is an SMF entity.

In one embodiment, the processor 500 is configured to: trigger the PCF to perform the policy control for the abnormal behavior, which then triggers the PCF to request the NWDAF to provide the abnormal behavior analytics for the UE when establishing or modifying mobility management or session management policy association towards the PCF entity.

In one embodiment, the processor 500 is configured to: trigger the PCF entity to request the NWDAF to provide the mobility related abnormal behavior analytics for the UE when the network function entity is an AMF entity; or trigger the PCF entity to request the NWDAF to provide PDU session related abnormal behavior analytics for the UE when the network function entity is an SMF entity.

Based on the same inventive concept, an embodiment of the present application further provides an NWDAF for determining analytics on UE behavior. Since this device is the device for the communication method provided by embodiments of the present application and the principle of this device to solve the problem is similar to that of the method, the implementations of this device may refer to the implementations of the method, and the repeated description thereof will be omitted here.

Figure 6:
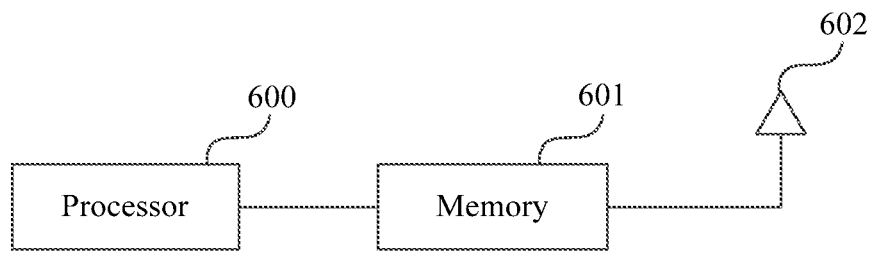
FIG. 6 is a structural schematic diagram of a first NWDAF for determining analytics on UE behavior provided by an embodiment of the present application.

As shown in FIG. 6, an embodiment of the present application provides an NWDAF for determining analytics on UE behavior. This device includes a processor 600, a memory 601 and a transceiver 602. The processor 600 is responsible for managing the bus architecture and general processing, and the memory 601 may store the data used by the processor 600 when performing the operations. The transceiver 602 is configured to receive and send the data under the control of the processor 600.

The bus architecture may include any numbers of interconnected buses and bridges, and link various circuits of one or more processors represented by the processor 600 and the memory represented by the memory 601. The bus architecture may further link various other circuits such as peripheral device, voltage regulator and power management circuit, which are all well known in the art and thus will not be further described again herein. The bus interface provides an interface. The processor 600 is responsible for managing the bus architecture and general processing, and the memory 601 may store the data used by the processor 600 when performing the operations.

The procedure disclosed by embodiments of the present application may be applied in the processor 600 or implemented by the processor 600. In the implementation process, each step of the signal processing flow may be completed by the integrated logic circuit of hardware in the processor 600 or the instruction in the form of software. The processor 600 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in embodiments of the present application. The general-purpose processor may be a microprocessor or any conventional processor or the like. The steps of the method disclosed in combination with embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 601, and the processor 600 reads the information in the memory 601 and completes the steps of the signal processing flow in combination with the hardware thereof.

The processor 600 is configured to read a program in the memory 601 and perform: receiving an indication sent by a network function entity and/or sent by a PCF entity triggered by the network function entity; and providing abnormal behavior analytics for a UE to the network function entity and/or the PCF entity according to the indication.

In one embodiment, the processor 600 is configured to: provide mobility related abnormal behavior analytics for the UE to an AMF entity and/or the PCF entity when the network function entity is the AMF entity; or provide PDU session related abnormal behavior analytics for the UE to an SMF entity and/or the PCF entity when the network function entity is the SMF entity.

Based on the same inventive concept, an embodiment of the present application further provides a PCF entity for determining analytics on UE behavior. Since this device is the device for the communication method provided by embodiments of the present application and the principle of this device to solve the problem is similar to that of the method, the implementations of this device may refer to the implementations of the method, and the repeated description thereof will be omitted here.

Figure 7:
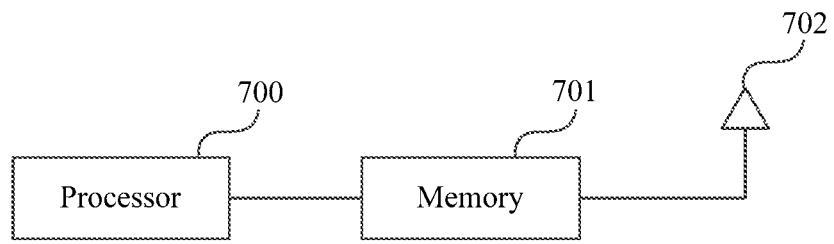
FIG. 7 is a structural schematic diagram of a first PCF for determining analytics on UE behavior provided by an embodiment of the present application.

As shown in FIG. 7, an embodiment of the present application provides a PCF entity for determining analytics on UE behavior. This device includes a processor 700, a memory 701 and a transceiver 702. The processor 700 is responsible for managing the bus architecture and general processing, and the memory 701 may store the data used by the processor 700 when performing the operations. The transceiver 702 is configured to receive and send the data under the control of the processor 700.

The bus architecture may include any numbers of interconnected buses and bridges, and link various circuits of one or more processors represented by the processor 700 and the memory represented by the memory 701. The bus architecture may further link various other circuits such as peripheral device, voltage regulator and power management circuit, which are all well known in the art and thus will not be further described again herein. The bus interface provides an interface. The processor 700 is responsible for managing the bus architecture and general processing, and the memory 701 may store the data used by the processor 700 when performing the operations.

The procedure disclosed by embodiments of the present application may be applied in the processor 700 or implemented by the processor 700. In the implementation process, each step of the signal processing flow may be completed by the integrated logic circuit of hardware in the processor 700 or the instruction in the form of software. The processor 700 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in embodiments of the present application. The general-purpose processor may be a microprocessor or any conventional processor or the like. The steps of the method disclosed in combination with embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 701, and the processor 700 reads the information in the memory 701 and completes the steps of the signal processing flow in combination with the hardware thereof.

The processor 700 is configured to read a program in the memory 701 and perform: receiving a notification from a network function entity of triggering policy control for an abnormal behavior of a UE when establishing or modifying the mobility management or session management policy association towards the network function entity; and requesting an NWDAF to provide abnormal behavior analytics of the UE.

In one embodiment, the processor 700 is configured to: request the NWDAF to provide mobility related abnormal behavior analytics of the UE when the network function entity is an AMF entity; or request the NWDAF to provide PDU session related abnormal behavior analytics of the UE when the network function entity is an SMF entity.

Based on the same inventive concept, an embodiment of the present application further provides a network function entity for determining analytics on UE behavior. Since this device is the device for the communication method provided by embodiments of the present application and the principle of this device to solve the problem is similar to that of the method, the implementations of this device may refer to the implementations of the method, and the repeated description thereof will be omitted here.

Figure 8:
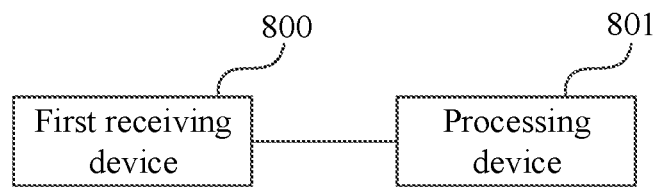
FIG. 8 is a structural schematic diagram of a second network function entity for determining analytics on UE behavior provided by an embodiment of the present application.

As shown in FIG. 8, an embodiment of the present application provides a structural schematic diagram of a network function entity for determining analytics on UE behavior. This device includes: a first receiving device 800 and a processing device 801. The first receiving device 800 is configured to: receive the target information of a UE; and the processing device 801 is configured to: request an NWDAF to provide abnormal behavior analytics for the UE in response to determining to perform the abnormal behavior analytics for the UE according to the target information; and/or trigger a PCF to perform the policy control for an abnormal behavior of the UE in response to determining to perform the policy control for the abnormal behavior of the UE according to the target information.

In one embodiment, the processing device 801 is configured to: determine to perform the abnormal behavior analytics for the UE and/or perform the policy control for the abnormal behavior of the UE according to received subscription of the UE when the target information is the subscription; or determine to perform the abnormal behavior analytics for the UE and/or perform the policy control for the abnormal behavior of the UE according to received monitoring event type of the UE when the target information is a monitoring event; or determine to perform the abnormal behavior analytics for the UE and/or perform the policy control for the abnormal behavior of the UE according to received UE capability when the target information is the UE capability.

In one embodiment, the processing device 801 is configured to: request the NWDAF to provide the mobility related abnormal behavior analytics for the UE according to the target information when the network function entity is an AMF entity; or request the NWDAF to provide PDU session related abnormal behavior analytics for the UE according to the target information when the network function entity is an SMF entity.

In one embodiment, the processing device 801 is configured to: trigger the PCF to perform the policy control for the abnormal behavior, which then triggers the PCF to request the NWDAF to provide the abnormal behavior analytics for the UE when establishing or modifying the mobility management or session management policy association towards the PCF entity.

In one embodiment, the processing device 801 is configured to: trigger the PCF entity to request the NWDAF to provide mobility related abnormal behavior analytics for the UE when the network function entity is an AMF entity; or trigger the PCF entity to request the NWDAF to provide PDU session related abnormal behavior analytics for the UE when the network function entity is an SMF entity.

Based on the same inventive concept, an embodiment of the present application further provides an NWDAF for determining analytics on UE behavior. Since this device is the device for the communication method provided by embodiments of the present application and the principle of this device to solve the problem is similar to that of the method, the implementations of this device may refer to the implementations of the method, and the repeated description thereof will be omitted here.

Figure 9:
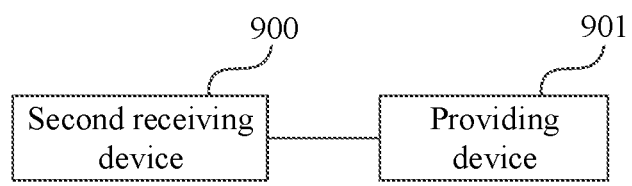
FIG. 9 is a structural schematic diagram of a second NWDAF for determining analytics on UE behavior provided by an embodiment of the present application.

As shown in FIG. 9, an embodiment of the present application provides an NWDAF for determining analytics on UE behavior. The NWDAF includes: a second receiving device 900 and a providing device 901. The second receiving device 900 is configured to: receive an indication sent by a network function entity and/or sent by a PCF entity triggered by the network function entity; and the providing device 901 is configured to: provide abnormal behavior analytics for a UE to the network function entity and/or the PCF entity according to the indication.

In one embodiment, the providing device 901 is configured to: provide the mobility related abnormal behavior analytics for the UE to the AMF entity and/or the PCF entity when the network function entity is an AMF entity; or provide PDU session related abnormal behavior analytics for the UE to the SMF entity and/or the PCF entity when the network function entity is an SMF entity.

Based on the same inventive concept, an embodiment of the present application further provides a PCF entity for determining analytics on UE behavior. Since this device is the device for the communication method provided by embodiments of the present application and the principle of this device to solve the problem is similar to that of the method, the implementations of this device may refer to the implementations of the method, and the repeated description thereof will be omitted here.

Figure 10:
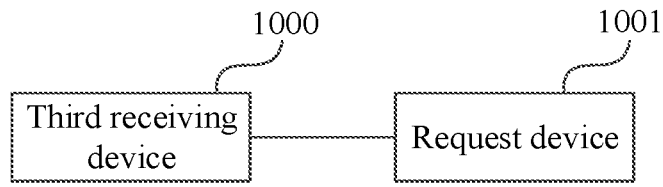
FIG. 10 is a structural schematic diagram of a third NWDAF for determining analytics on UE behavior provided by an embodiment of the present application.

As shown in FIG. 10, an embodiment of the present application provides a PCF entity for determining analytics on UE behavior. The PCF entity includes: a third receiving device 1000 and a request device 1001. The third receiving device 1000 is configured to: receive a notification from a network function entity of triggering policy control for an abnormal behavior of a UE when establishing or modifying the mobility management or session management policy association towards the network function entity; and the request device 1001 is configured to: request an NWDAF to provide abnormal behavior analytics of the UE.

In one embodiment, the request device 1001 is configured to: request the NWDAF to provide mobility related abnormal behavior analytics of the UE when the network function entity is an AMF entity; or request the NWDAF to provide PDU session related abnormal behavior analytics of the UE when the network function entity is an SMF entity.

An embodiment of the present application further provides a computer storable medium for determining analytics on UE behavior, on which a computer program is stored. The program, when executed by a processor, implements the steps of the method described in FIG. 2 or 3 or 4 described above.

Examples are illustrated as follows.

Figure 11:
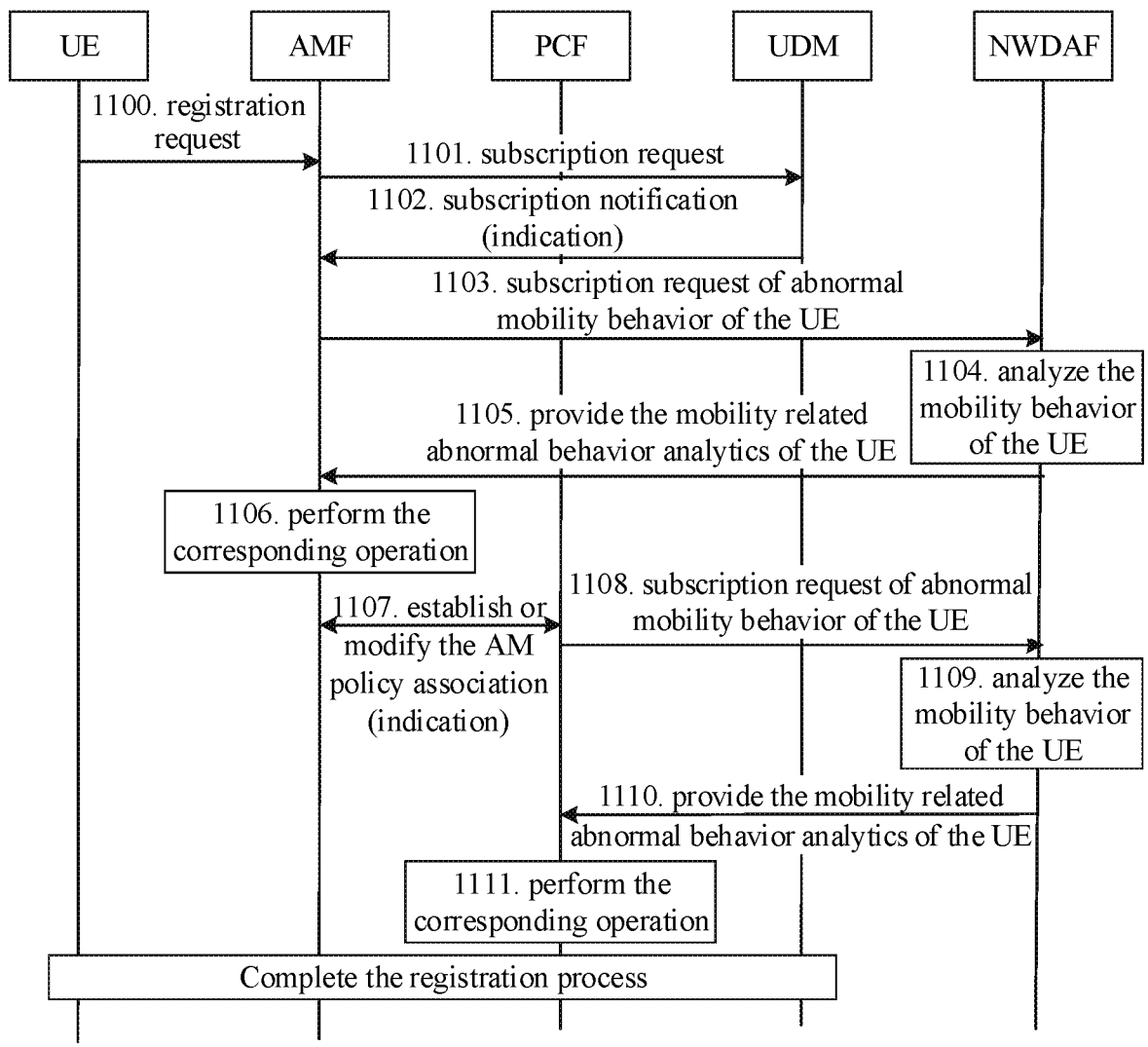
FIG. 11 is a schematic diagram of a process of providing mobility related behavior analytics for the UE triggered based on monitoring of the UE mobility behavior provided by an embodiment of the present application.

Embodiment 1: as shown in FIG. 11, triggering based on monitoring of the UE mobility behavior is illustrated.

1100: a UE sends a registration request to an AMF.

1101: after the UE is registered on the network, the AMF sends a subscription request of the UE to the UDM (Unified Data Management).

1102: the UDM returns a subscription notification of the UE to the AMF, where the notification carries the UE's subscription, and the UE's subscription contains an indication indicating that the UE's mobility behavior needs to be monitored or analyzed.

1103: after the AMF determines that the AMF cannot meet the monitoring or analysis requirement required in the subscription, the AMF sends a subscription request of abnormal behavior of the UE to the NWDAF, where the subscription request of abnormal behavior instructs the NWDAF to analyze the mobility behavior of the UE.

1104: if the NWDAF has not yet analyzed the abnormal mobility behavior of the UE, the NWDAF analyzes the mobility behavior of the UE.

1105: the NWDAF provides the AMF with the abnormal behavior analytics of the UE after detecting the abnormal mobility behavior of the UE.

1106: the AMF performs the corresponding operation according to the received abnormal behavior analytics of the UE.

1107: the AMF indicates to the PCF that the PCF needs to monitor or perform the policy control for the abnormal mobility behavior of the UE when the AMF establishing or modifying the mobility management policy association towards the PCF.

It should be noted that the source AMF further needs to send a subscription request to the NWDAF if the AMF changes.

1108: the PCF sends a subscription request of abnormal behavior of the UE to the NWDAF according to the indication, where the subscription request of abnormal behavior instructs the NWDAF to provide the mobility related abnormal behavior analytics of the UE.

1109: if the NWDAF has not yet analyzed the abnormal mobility behavior of the UE, the NWDAF analyzes the abnormal mobility behavior of the UE.

1110: the NWDAF provides the PCF entity with the mobility related abnormal behavior analytics of the UE after detecting the abnormal mobility behavior of the UE.

1111: the PCF entity performs the corresponding operation according to the mobility related abnormal behavior analytics of the UE.

The subsequent registration process is the same as the existing process.

The subscription request of the AMF or PCF may trigger the NWDAF to analyze the mobility behavior of the UE, that is, if the NWDAF has not yet analyzed the abnormal mobility behavior of the UE when receiving the subscription request, the NWDAF may start the analytics and notification of the abnormal mobility behavior of the UE.

Figure 12:
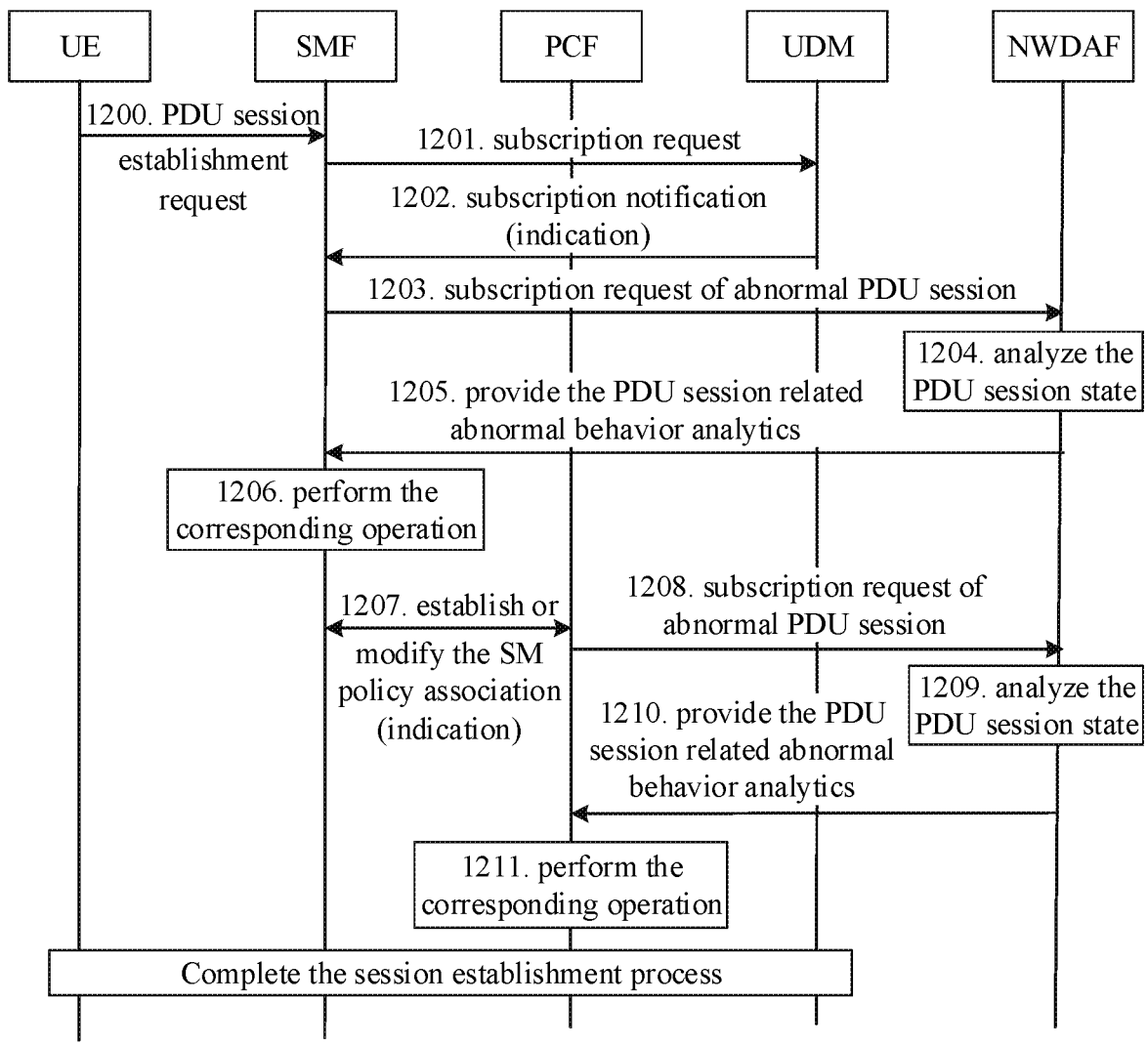
FIG. 12 is a schematic diagram of a process of providing PDU session related behavior analytics for the UE triggered based on monitoring of the UE session state provided by an embodiment of the present application.

Embodiment 2: as shown in FIG. 12, triggering based on monitoring of the UE session state is illustrated.

1200: a UE sends a PDU session establishment request to an SMF entity in the process of establishing a PDU session by the UE.

1201: the SMF entity sends a subscription request to a UDM entity.

1202: the UDM entity returns a subscription notification to the SMF entity, where the subscription notification carries the subscription, and the subscription contains an indication indicating that it is necessary to monitor or analyze the PDU session state which uses the specified S-NSSAI (Single-Network Slice Selection Assistance Information) and the specified DNN (Data Network Name).

1203: after the SMF determines that the SMF cannot meet the monitoring or analysis requirement required in the subscription, the SMF sends a subscription request of abnormal PDU session to the NWDAF, where the subscription request of the abnormal PDU session instructs the NWDAF to analyze the PDU session state.

1204: if the NWDAF has not yet analyzed the abnormal PDU session, the NWDAF analyzes the PDU session state.

1205: the NWDAF provides the SMF entity with the PDU session related abnormal behavior analytics after detecting the abnormal PDU session of the UE.

1206: the SMF entity performs the corresponding operation according to the received PDU session related behavior analytics.

1207: the SMF entity indicates to the PCF entity that the PCF entity needs to monitor or perform the abnormity control for PDU session when the SMF entity establishing a session management policy association towards the PCF entity.

1208: the PCF entity sends a subscription request of abnormal PDU session to the NWDAF according to the indication, where the subscription request of abnormal PDU session instructs the NWDAF to analyze the PDU session state.

1209: if the NWDAF has not yet analyzed the abnormal PDU session of the UE, the NWDAF analyzes the abnormal PDU session of the UE.

1210: the NWDAF provides the PCF entity with the PDU session related abnormal behavior analytics after detecting the abnormal PDU session of the UE.

1211: the PCF entity performs the corresponding operation according to the received PDU session related abnormal behavior analytics.

The subsequent PDU session establishment process is the same as the existing process. The subscription request of the SMF or PCF may trigger the NWDAF to analyze and notify the PDU session state.

Figure 13:
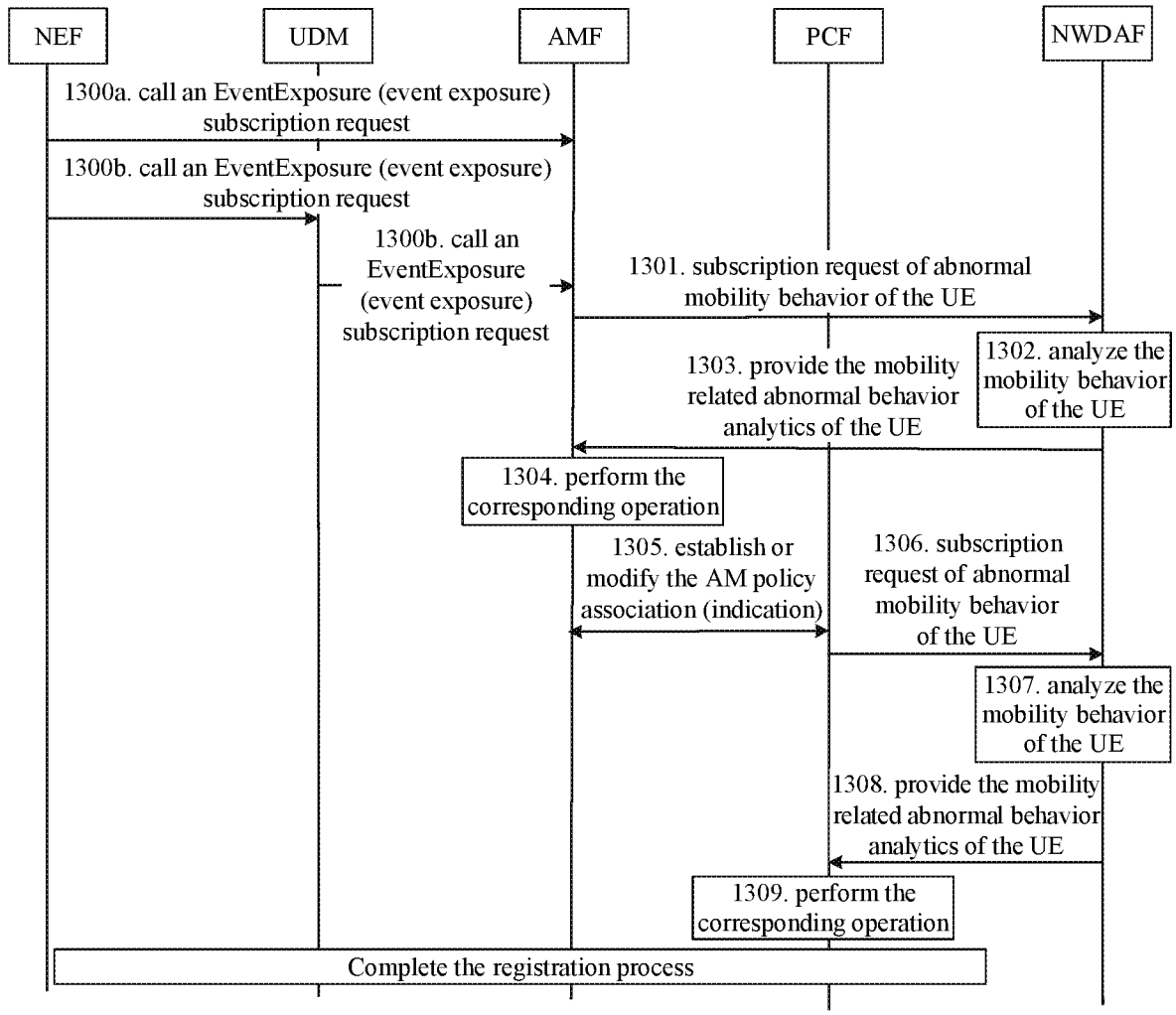
FIG. 13 is a schematic diagram of a process of providing mobility related behavior analytics for the UE triggered based on the external monitoring event provided by an embodiment of the present application.

Embodiment 3: as shown in FIG. 13, an external monitoring event triggers the mobility related behavior analytics for the UE.

S1300: the NEF determines that the NEF needs to send an EventExposure (event exposure) subscription request to the AMF according to the type of the monitored event.

It should be noted that there are two ways for the NEF to send the EventExposure subscription request to the AMF. As shown in FIG. 13, S1300a is to directly call the EventExposure subscription service of the AMF, and the S1300b is to firstly call the EventExposure subscription service of the UDM, and then the UDM calls the EventExposure subscription service of the AMF.

1301: the AMF entity determines that the AMF entity needs to request the NWDAF to provide the mobility related abnormal behavior analytics for the UE according to the type of the monitored event, and the AMF entity sends a subscription request of the mobility related abnormal behavior of the UE to the NWDAF.

For example, when the monitored event indicates that the AMF needs to report the location information of the legal terminal in the area, the AMF determines to request the mobility related abnormal behavior analytics from the NWDAF.

1302: if the NWDAF has not yet analyzed the abnormal mobility behavior of the UE, the NWDAF analyzes the mobility behavior of the UE.

1303: the NWDAF provides the AMF with the mobility related behavior analytics of the UE after detecting the abnormal mobility behavior of the UE.

1304: the AMF performs the corresponding operation according to the received mobility related behavior analytics for the UE.

1305: the AMF indicates to the PCF that the PCF needs to monitor or perform the abnormity control on the mobility behavior of the UE when the AMF establishing or modifying the mobility management policy association towards the PCF.

It should be noted that the source AMF further needs to send a subscription request to the NWDAF if the AMF changes.

1306: the PCF sends a subscription request of abnormal behavior of the UE to the NWDAF according to the indication, where the subscription request of abnormal behavior instructs the NWDAF to analyze the mobility behavior of the UE.

1307: if the NWDAF has not yet analyzed the abnormal mobility behavior of the UE, the NWDAF analyzes the mobility behavior of the UE.

1308: the NWDAF provides the PCF entity with the mobility related abnormal behavior analytics of the UE after detecting the abnormal mobility behavior of the UE.

1309: the PCF entity performs the corresponding operation according to the mobility related abnormal behavior analytics of the UE.

The subsequent registration process is the same as the existing process. The subscription request of the AMF or PCF will trigger the NWDAF to analyze and notify the mobility behavior of the UE.

Figure 14:
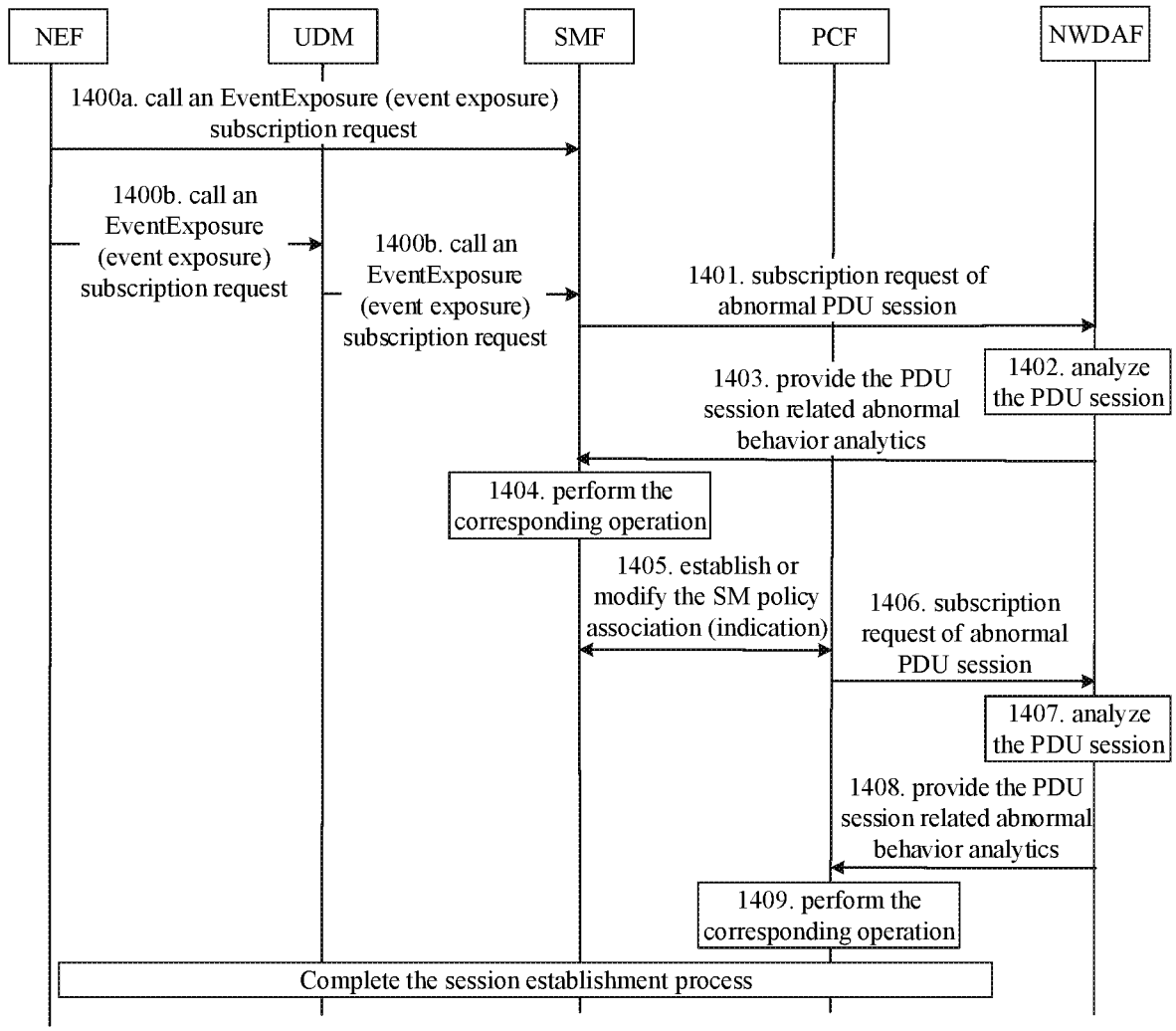
FIG. 14 is a schematic diagram of a process of providing PDU session related behavior analytics for the UE triggered based on the external monitoring event provided by an embodiment of the present application.

Embodiment 4: as shown in FIG. 14, an external monitoring event triggers the PDU session related behavior analytics for the UE.

S1400: the NEF determines that the NEF needs to send an EventExposure subscription request to the SMF according to the type of the monitored event.

It should be noted that there are two ways for the NEF to send the EventExposure subscription request to the SMF. As shown in FIG. 14, S1400a is to directly call the EventExposure subscription service of the SMF, and the S1400b is to firstly call the EventExposure subscription service of the UDM, and then the UDM calls the EventExposure subscription service of the SMF.

1401: the SMF entity determines that the SMF entity needs to request the NWDAF to provide the PDU session related abnormal behavior analytics for the UE according to the type of the monitored event, and the SMF entity sends a subscription request of the abnormal PDU session of the UE to the NWDAF.

For example, when the monitored event indicates that the SMF needs to report the abnormal traffic information of the UE, the SMF determines to request the PDU session related behavior analytics for the UE from the NWDAF.

1402: if the NWDAF has not yet analyzed the abnormal PDU session of the UE, the NWDAF analyzes the PDU session of the UE.

1403: the NWDAF provides the SMF with the PDU session related abnormal behavior analytics of the UE after detecting the abnormal PDU session of the UE.

1404: the SMF performs the corresponding operation according to the received PDU session related abnormal behavior analytics of the UE.

1405: the SMF entity indicates to the PCF entity that the PCF entity needs to monitor or perform the abnormity control for the PDU session state when the SMF entity establishing a session management policy association towards the PCF entity.

1406: the PCF entity sends a subscription request of abnormal PDU session to the NWDAF according to the indication, where the subscription request of abnormal PDU session instructs the NWDAF to analyze the PDU session state.

1407: if the NWDAF has not yet analyzed the abnormal PDU session of the UE, the NWDAF analyzes the PDU session state.

1408: the NWDAF provides the PCF entity with the PDU session related abnormal behavior analytics for the UE after detecting the abnormal PDU session of the UE.

1409: the PCF entity performs the corresponding operation according to the received PDU session related behavior analytics for the UE.

The subsequent PDU session establishment process is the same as the existing process. The subscription request of the SMF or PCF may trigger the NWDAF to analyze and notify the PDU session state.

Figure 15:
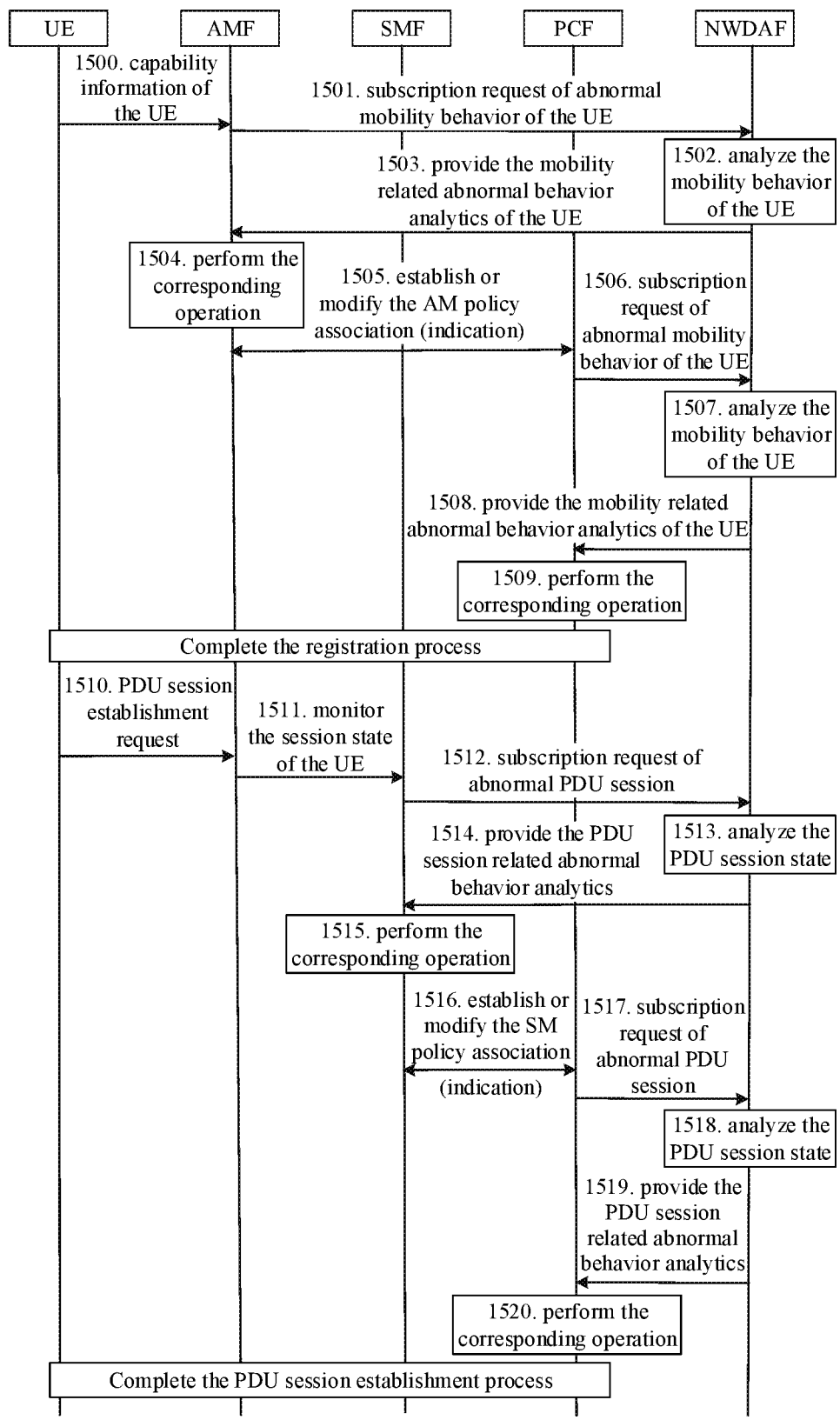
FIG. 15 is a schematic diagram of a process of providing mobility related behavior analytics and/or PDU session related behavior analytics for the UE triggered based on the UE capability provided by an embodiment of the present application.

Embodiment 5: as shown in FIG. 15, the mobility related behavior analytics or PDU session related behavior analytics for the UE is triggered based on the UE capability.

In this embodiment, the operator may configure the network to monitor and analyze specific types of UEs, for example, configure the network to perform the mobility related abnormal behavior analytics for specific IoT UEs based on the SLA (Service Level Agreement) of the application layer service provider. Therefore, the AMF may determine that the AMF needs to trigger the mobility related behavior analytics or session related behavior analytics for the UE according to the UE type.

1500: after a UE is registered on the network, the AMF obtains the UE capability.

1501: the AMF determines that the AMF needs to monitor the behavior of the UE according to the UE capability information, and then the AMF subscribes to the NWDAF for the abnormal behavior report of the UE, where the subscription request instructs the NWDAF to analyze the mobility behavior of the UE.

1502: if the NWDAF has not yet analyzed the abnormal mobility behavior of the UE, the NWDAF analyzes the mobility behavior of the UE.

1503: the NWDAF provides the AMF with the mobility related abnormal behavior analytics of the UE after detecting the abnormal mobility behavior of the UE.

1504: the AMF performs the corresponding operation according to the received mobility related abnormal behavior analytics for the UE.

1505: the AMF indicates to the PCF that the PCF needs to monitor or perform the abnormity control of the mobility behavior of the UE when the AMF establishing or modifying the mobility management policy association towards the PCF.

It should be noted that the source AMF further needs to send a subscription request to the NWDAF if the AMF changes.

1506: the PCF sends a subscription request of abnormal behavior of the UE to the NWDAF according to the indication, where the subscription request of abnormal behavior instructs the NWDAF to analyze the mobility behavior of the UE.

1507: if the NWDAF has not yet analyzed the abnormal mobility behavior of the UE, the NWDAF analyzes the mobility behavior of the UE.

1508: the NWDAF provides the PCF entity with the mobility related abnormal behavior analytics of the UE after detecting the abnormal mobility behavior of the UE.

1509: the PCF entity performs the corresponding operation according to the mobility related abnormal behavior analytics of the UE.

The subsequent registration process is the same as the existing process. The subscription request of the AMF or PCF may trigger the NWDAF to analyze and notify the mobility behavior of the UE.

1510: the AMF requests the UE to establish a PDU session in the PDU session establishment process.

1511: the AMF indicates to the SMF that the SMF needs to monitor the session state of the UE.

1512: the SMF subscribes to the NWDAF for the abnormal behavior report of the PDU session according to the indication of the AMF, where the subscription request instructs the NWDAF to analyze the PDU session state.

1513: if the NWDAF has not yet analyzed the abnormal PDU session of the UE, the NWDAF analyzes the session state of the UE.

1514: the NWDAF provides the SMF entity with the PDU session related abnormal behavior analytics for the UE after detecting the abnormal PDU session of the UE.

1515: the SMF entity performs the corresponding operation according to the received PDU session related behavior analytics for the UE.

1516: the SMF entity indicates to the PCF entity that the PCF entity needs to monitor or perform the abnormity control for the PDU session state when the SMF entity establishing a session management policy association towards the PCF entity.

1517: the PCF entity sends a subscription request of abnormal PDU session to the NWDAF according to the indication, where the subscription request of PDU session state instructs the NWDAF to analyze the PDU session state.

1518: if the NWDAF has not yet analyzed the abnormal PDU session of the UE, the NWDAF analyzes the PDU session.

1519: the NWDAF provides the PCF entity with the PDU session related abnormal behavior analytics after detecting the abnormal PDU session of the UE.

1520: the PCF entity performs the corresponding operation according to the received analysis information of the abnormal PDU session.

The subsequent PDU session establishment process is the same as the existing process. The subscription request of the SMF or PCF may trigger the NWDAF to analyze and notify the PDU session state.

The present application has been described above by reference to the block diagrams and/or flow charts showing the methods, devices (systems) and/or computer program products according to embodiments of the present application. It should be understood that one block shown in the block diagrams and/or flow charts and a combination of the blocks shown in the block diagrams and/or flow charts may be implemented by the computer program instructions. These computer program instructions may be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application may also be implemented by the hardware and/or software (including the firmware, resident software, microcode and the like). Further, the present application may adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium may be any medium, which may contain, store, communicate with, transmit or transfer the programs, to be used by the instruction execution system, apparatus or device, or used in combination with the instruction execution system, apparatus or device.

What is claimed is:

1. A method for determining analytics on User Equipment, UE, behavior, the method comprising:
    receiving, by a network function entity, target information of a UE;
    sending an indication to a Network Data Analytic Function, NWDAF, for requesting the NWDAF to provide abnormal behavior analytics for the UE according to the indication when the network function entity determines to perform the abnormal behavior analytics for the UE according to the target information; and/or sending a notification to a Policy Control Function, PCF, for triggering the PCF to perform policy control for an abnormal behavior of the UE, which then triggers the PCF to request the NWDAF to provide abnormal behavior analytics for the UE when the network function entity establishes or modifies mobility management or session management policy association towards the PCF entity, when the network function entity determines to perform the policy control for the abnormal behavior of the UE according to the target information;
    wherein the abnormal behavior analytics comprises mobility related abnormal behavior analytics or PDU session related abnormal behavior analytics.

2. The method according to claim 1, wherein determining, by the network function entity, to perform the abnormal behavior analytics for the UE and/or perform the policy control for the abnormal behavior of the UE according to the received target information of the UE, comprises:
    determining, by the network function entity, to perform the abnormal behavior analytics for the UE and/or perform the policy control for the abnormal behavior of the UE according to received subscription of the UE when the target information is the subscription; or
    determining, by the network function entity, to perform the abnormal behavior analytics for the UE and/or perform the policy control for the abnormal behavior of the UE according to received monitoring event type of the UE when the target information is a monitoring event; or
    determining, by the network function entity, to perform the abnormal behavior analytics for the UE and/or perform the policy control for the abnormal behavior of the UE according to received UE capability when the target information is the UE capability.

3. The method according to claim 1, wherein requesting the NWDAF to provide abnormal behavior analytics for the UE, comprises:
    requesting, by an Access and mobility Management Function, AMF, entity, the NWDAF to provide mobility related abnormal behavior analytics for the UE when the network function entity is the AMF entity; or
    requesting, by a Session Management Function, SMF, entity, the NWDAF to provide PDU session related abnormal behavior analytics for the UE when the network function entity is the SMF entity.

4. The method according to claim 1, wherein triggering the PCF to perform the policy control for the abnormal behavior, which then triggers the PCF to request the NWDAF to provide the abnormal behavior analytics for the UE when the network function entity establishes or modifies mobility management or session management policy association towards the PCF entity, comprises:
    triggering, by an AMF entity, the PCF entity to request the NWDAF to provide mobility related abnormal behavior analytics for the UE when the network function entity is the AMF entity; or
    triggering, by an SMF entity, the PCF entity to request the NWDAF to provide PDU session related abnormal behavior analytics for the UE when the network function entity is the SMF entity.

5. A method for determining analytics on User Equipment, UE, behavior, the method comprising:
    receiving, by a Network Data Analytic Function, NWDAF, an indication sent by a network function entity and/or sent by a Policy Control Function, PCF, triggered by the network function entity;
    providing, by the NWDAF, corresponding abnormal behavior analytics for a UE to the network function entity and/or the PCF entity according to the indication;
    wherein the abnormal behavior analytics comprises mobility related abnormal behavior analytics or PDU session related abnormal behavior analytics.

6. The method according to claim 5, wherein providing, by the NWDAF, abnormal behavior analytics for the UE to the network function entity and/or the PCF entity according to the indication, comprises:
    providing, by the NWDAF, mobility related abnormal behavior analytics for the UE to an Access and mobility Management Function, AMF, entity and/or the PCF entity when the network function entity is the AMF entity; or
    providing, by the NWDAF, PDU session related abnormal behavior analytics for the UE to a Session Management Function, SMF, entity and/or the PCF entity when the network function entity is the SMF entity.

7. A network function entity for determining analytics on User Equipment, UE, behavior, the network function entity comprising: a processor, a memory and a transceiver; wherein the processor is configured to read a program in the memory and perform:
- receiving target information of a UE;
- sending an indication to a Network Data Analytic Function, NWDAF, for requesting the NWDAF to provide abnormal behavior analytics for the UE according to the indication in response to determining to perform the abnormal behavior analytics for the UE according to the target information; and/or sending a notification to a Policy Control Function, PCF, for triggering the PCF to perform policy control for an abnormal behavior of the UE, which then triggers the PCF to request the NWDAF to provide abnormal behavior analytics for the UE when the network function entity establishes or modifies mobility management or session management policy association towards the PCF entity, in response to determining to perform the policy control for the abnormal behavior of the UE according to the target information;
- wherein the abnormal behavior analytics comprises mobility related abnormal behavior analytics or PDU session related abnormal behavior analytics.

8. The network function entity according to claim 7, wherein the processor is configured to:
- determine to perform the abnormal behavior analytics for the UE and/or perform the policy control for the abnormal behavior of the UE according to received subscription of the UE when the target information is the subscription; or
- determine to perform the abnormal behavior analytics for the UE and/or perform the policy control for the abnormal behavior of the UE according to received monitoring event type of the UE when the target information is a monitoring event; or
- determine to perform the abnormal behavior analytics for the UE and/or perform the policy control for the abnormal behavior of the UE according to received UE capability when the target information is the UE capability.

9. The network function entity according to claim 7, wherein the processor is configured to:
- request the NWDAF to provide mobility related abnormal behavior analytics for the UE when the network function entity is an Access and mobility Management Function, AMF, entity; or
- request the NWDAF to provide PDU session related abnormal behavior analytics for the UE when the network function entity is a Session Management Function, SMF, entity.

10. The network function entity according to claim 7, wherein the processor is configured to:
- trigger the PCF entity to request the NWDAF to provide mobility related abnormal behavior analytics for the UE when the network function entity is an AMF entity; or
- trigger the PCF entity to request the NWDAF to provide PDU session related abnormal behavior analytics for the UE when the network function entity is an SMF entity.

11. A non-transitory computer storage medium storing a computer program thereon, wherein the program implements operations when executed by a processor, the operations comprising:
- receiving target information of a UE;
- sending an indication to a Network Data Analytic Function, NWDAF, or requesting the NWDAF to provide abnormal behavior analytics for the UE according to the indication in response to determining to perform the abnormal behavior analytics for the UE according to the target information; and/or sending a notification to a Policy Control Function, PCF, for triggering the PCF to perform policy control for an abnormal behavior of the UE, which then triggers the PCF to request the NWDAF to provide abnormal behavior analytics for the UE when the network function entity establishes or modifies mobility management or session management policy association towards the PCF entity, in response to determining to perform the policy control for the abnormal behavior of the UE according to the target information;
- wherein the abnormal behavior analytics comprises mobility related abnormal behavior analytics or PDU session related abnormal behavior analytics.

12. The non-transitory computer storage medium according to claim 11, wherein determining to perform the abnormal behavior analytics for the UE and/or perform the policy control for the abnormal behavior of the UE according to the received target information of the UE, comprises:
- determining to perform the abnormal behavior analytics for the UE and/or perform the policy control for the abnormal behavior of the UE according to received subscription of the UE when the target information is the subscription; or
- determining to perform the abnormal behavior analytics for the UE and/or perform the policy control for the abnormal behavior of the UE according to received monitoring event type of the UE when the target information is a monitoring event; or
- determining to perform the abnormal behavior analytics for the UE and/or perform the policy control for the abnormal behavior of the UE according to received UE capability when the target information is the UE capability.

13. The non-transitory computer storage medium according to claim 11, wherein requesting the NWDAF to provide abnormal behavior analytics for the UE, comprises:
- requesting, by an Access and mobility Management Function, AMF, entity, the NWDAF to provide mobility related abnormal behavior analytics for the UE when a network function entity is the AMF entity; or
- requesting, by a Session Management Function, SMF, entity, the NWDAF to provide PDU session related abnormal behavior analytics for the UE when the network function entity is the SMF entity.

14. The non-transitory computer storage medium according to claim 11, wherein triggering the PCF to perform the policy control for the abnormal behavior, which then triggers the PCF to request the NWDAF to provide the abnormal behavior analytics for the UE when the network function entity establishes or modifies mobility management or session management policy association towards the PCF entity, comprises:
- triggering, by an AMF entity, the PCF entity to request the NWDAF to provide mobility related abnormal behavior analytics for the UE when a network function entity is the AMF entity; or
- triggering, by an SMF entity, the PCF entity to request the NWDAF to provide PDU session related abnormal behavior analytics for the UE when the network function entity is the SMF entity.

* * * * *